(12) United States Patent
Salter et al.

(10) Patent No.: US 9,487,135 B2
(45) Date of Patent: Nov. 8, 2016

(54) DOME LIGHT ASSEMBLY

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US); Todd Jared Konet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/735,499

(22) Filed: Jun. 10, 2015

(65) Prior Publication Data

US 2015/0274067 A1    Oct. 1, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 3/02* | (2006.01) |
| *H05B 37/02* | (2006.01) |
| *B60Q 3/00* | (2006.01) |

(52) U.S. Cl.
CPC .............. *B60Q 3/0293* (2013.01); *B60Q 3/008* (2013.01); *B60Q 3/0279* (2013.01); *B60Q 3/0289* (2013.01); *H05B 37/0218* (2013.01); *H05B 37/0227* (2013.01); *B60Q 2500/10* (2013.01); *Y02B 20/46* (2013.01)

(58) Field of Classification Search
CPC .. B60Q 3/008; B60Q 3/0279; B60Q 3/0289; B60Q 3/0293; H05B 37/0218; H05B 37/0227
USPC .......................................... 362/490, 509–510
See application file for complete search history.

(56) References Cited

U.S. PATENT DOCUMENTS

| | | | |
|---|---|---|---|
| 5,709,453 | A | 1/1998 | Krent et al. |
| 6,031,511 | A | 2/2000 | DeLuca et al. |
| 6,117,362 | A | 9/2000 | Yen et al. |
| 6,494,490 | B1 | 12/2002 | Trantoul |
| 6,508,563 | B2 | 1/2003 | Parker et al. |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A dome light assembly for a vehicle is provided herein. The dome light assembly includes a headliner having a trough and a light-producing assembly arranged as a strip configured to be received in the trough. The light-producing assembly includes a plurality of light sources and a photoluminescent structure configured to luminesce in response to excitation by the plurality of light sources.

18 Claims, 3 Drawing Sheets

(56) References Cited

U.S. PATENT DOCUMENTS

| | | |
|---|---|---|
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,162,519 B2 | 4/2012 | Salter et al. |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,506,141 B2 | 8/2013 | Cannon et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0073708 A1 | 3/2009 | Kino et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2228258 A2 | 9/2010 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

DOME LIGHT ASSEMBLY

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a dome light assembly for a vehicle is provided. The dome light assembly includes a headliner having a trough and a light-producing assembly arranged as a strip configured to be received in the trough. The light-producing assembly includes a plurality of light sources and a photoluminescent structure configured to luminesce in response to excitation by the plurality of light sources.

According to another aspect of the present invention, a dome light assembly for a vehicle is provided. The dome light assembly includes a headliner having a trough extending in a longitudinal direction with respect to the vehicle and a light-producing assembly arranged as a strip configured to be received in the trough. The light-producing assembly includes a plurality of light sources and a photoluminescent structure configured to luminesce in response to excitation by the plurality of light sources.

According to yet another aspect of the present invention, a dome light assembly for a vehicle is provided. The dome light assembly includes a headliner having a trough and a light-producing assembly arranged as a strip configured to be received in the trough. The light-producing assembly includes a plurality of light sources dispersed at variable densities and a photoluminescent structure configured to luminesce in response to excitation by the plurality of light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to a dome light assembly for use in a vehicle and operable to provide interior vehicle lighting. While the dome light assembly is contemplated for use in automobiles, it should be appreciated that the dome light assembly disclosed herein may be similarly adapted for use in other types of vehicles designed to transport one or more passengers such as, but not limited to, aircraft, watercraft, and locomotives.

Figure 1:
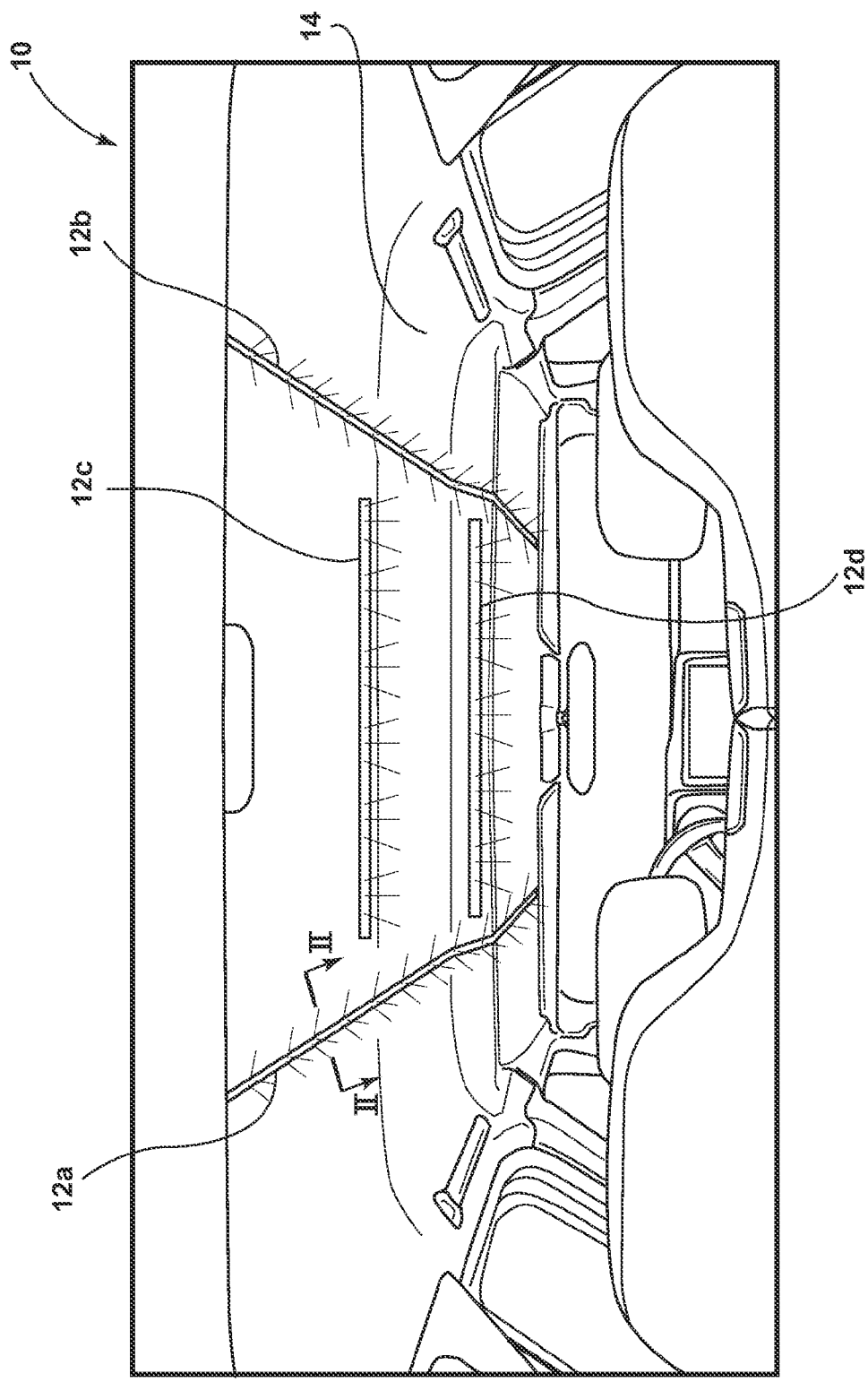
FIG. 1 illustrates a vehicle equipped with a dome light assembly, according to one embodiment.

Referring to FIG. 1, the cabin of a vehicle 10 is generally shown according to one embodiment. The vehicle 10 includes one or more light-producing assemblies, which are exemplarily shown as light-producing assemblies 12a-12d. Light-producing assemblies 12a-12d are coupled to a roof structure such as headliner 14. Each light-producing assembly 12a-12d may be arranged as a strip of varying length and width and may extend in a longitudinal direction, as shown by light-producing assemblies 12a and 12b, a lateral direction, as shown by light-producing assemblies 12c and 12d, or other desired direction with respect to the vehicle 10. As will be described below in greater detail, a given light-producing assembly 12a-12d benefits from a thin design and may be constructed to flex in order to complement the contours of the headliner 14. Additionally, a given light-producing assembly 12a-12d is operable to luminesce, as demonstrated by the lines in FIG. 1, to provide ambient or task lighting to the vehicle cabin. Thus, it is contemplated that the use of one or more light-producing assemblies may reduce or even eliminate the need for conventional dome lamps.

Figure 2:
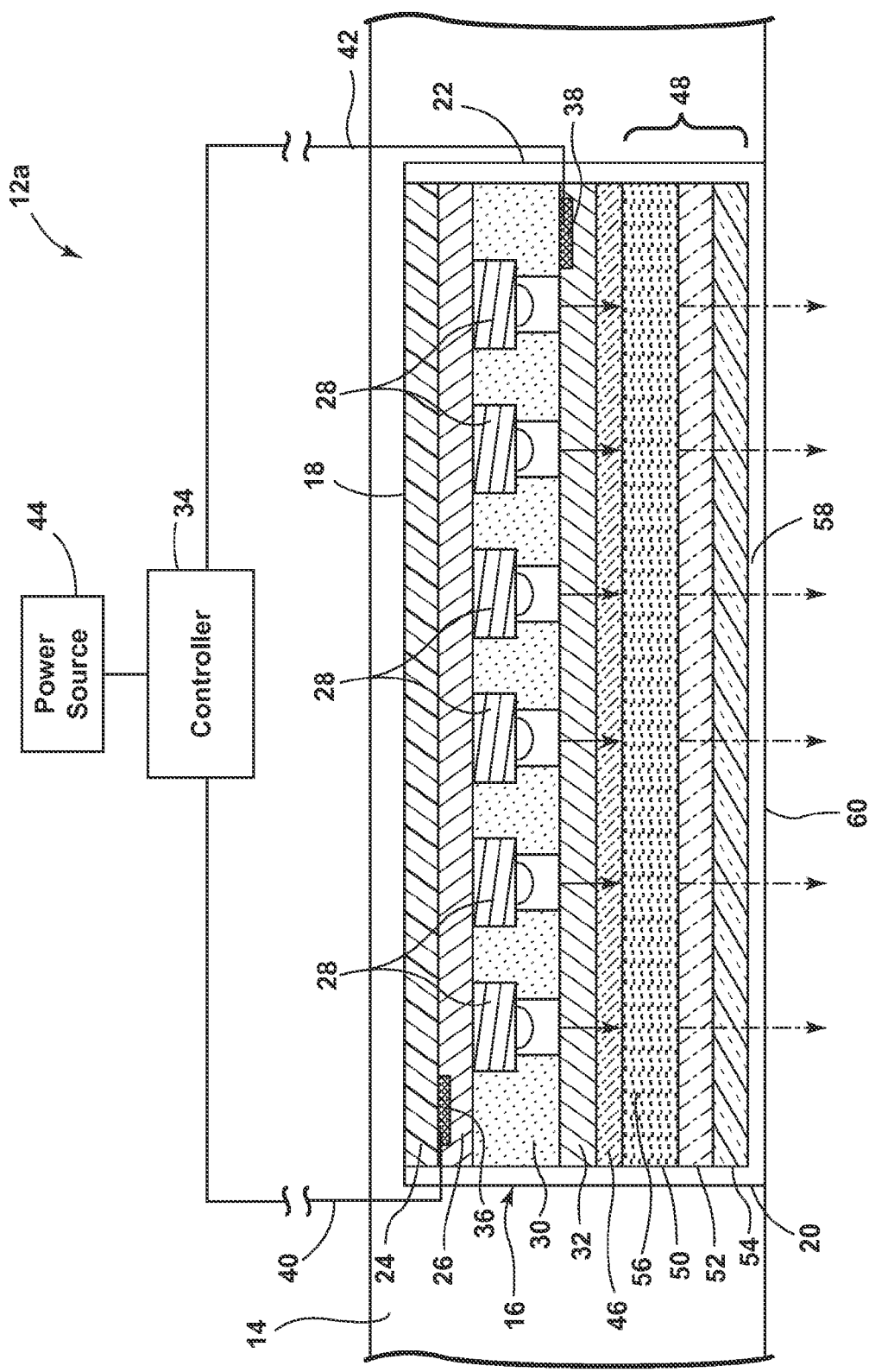
FIG. 2 is a cross-sectional view of a dome light assembly taken along line II-II of FIG. 1, according to one embodiment.

Referring to FIG. 2, a cross-sectional view of light-producing assembly 12a and a corresponding portion of the headliner 14 is shown according to one embodiment. It should be appreciated that light-producing assemblies 12b-12d may be similarly arranged. According to the illustrated embodiment, the headliner 14 includes a trough 16 defined by base 18 and sidewalls 20 and 22. The trough 16 is sized to receive the light-producing assembly 12a such that the light-producing assembly 12a is substantially flush with the headliner 14. Alternatively, if it is desired for the light-producing assembly 12a to protrude from the headliner 14, the depth of the trough 16 may be adjusted accordingly or the trough 16 may be eliminated altogether. Alternatively still, if it is desired for the light-producing assembly 12a to be concealed from view when in a deactivated state, the light-producing assembly 12a may be located inside the headliner 14. In such an arrangement, however, the headliner 14 should include a fabric or other material that is sufficiently permeable to light outputted by the light-producing assembly 12a.

The light-producing assembly 12a includes a substrate 24 arranged below the base 18 of the trough 16. The substrate 24 may include a polycarbonate, poly-methyl methacrylate (PMMA), or polyethylene terephthalate (PET) material on the order of 0.005 to 0.060 inches thick. A positive electrode 26 is arranged below the substrate 24 and includes a conductive epoxy such as, but not limited to, a silver-containing or copper-containing epoxy. The positive electrode 26 is electrically connected to a plurality of light sources such as LEDs 28, which are arranged within a semiconductor ink 30 and applied to the underside of the positive electrode 26. A negative electrode 32 is also electrically connected to the LEDs 28. The negative electrode 32 is arranged below the semiconductor ink 30 and includes a transparent or translucent conductive material such as, but not limited to, indium tin oxide. In alternative embodiments, the positive and negative electrodes 26, 32 may be flip-flopped, in which case the positive electrode 26 should include a transparent or translucent conductive material to transmit light emitted from the LEDs 28.

Each of the positive and negative electrodes 26, 32 are electrically connected to a controller 34 via a corresponding bus bar 36, 38 and a corresponding conductive lead 40, 42. The bus bars 36, 38 may be printed along opposite edges of the positive and negative electrodes 26, 32 and the points of connection between the bus bars 36, 38 and the conductive leads 40, 42 may be at opposite corners of each bus bar 36, 38 to promote uniform current distribution along the bus bars 36, 38. The conductive leads 40, 42 may be wired through roof frame of the vehicle 10 to the controller 34, which may be variously located in the vehicle 10 and is also electrically connected to a power source 44. In one embodiment, the power source 44 may correspond to a vehicular power source operating at 12 to 16 VDC.

The controller 34 may control the LEDs 28 based on one or more signals received from vehicle equipment, user-operated switches, and the like. In one embodiment, the signals may include a vehicle-related condition such as, but not limited to, an operational state of the vehicle, a status related to a particular vehicle equipment (e.g., door open status), a key fob proximity status, a remote signal sourced from a portable electronic device, a status related to an operating environment of the vehicle (e.g., an ambient light level), or any other information or control signal that may be utilized to activate or otherwise adjust the output of the LEDs 28.

The LEDs 28 may be dispersed in a random or controlled fashion within the semiconductor ink 30 and are disposed facing the vehicle cabin and may be configured to emit focused or non-focused light. The LEDs 28 may correspond to micro-LEDs of gallium nitride elements on the order of 5 to 400 microns in size and the semiconductor ink 30 may include various binders and dielectric material including, but not limited to, one or more of gallium, indium, silicon carbide, phosphorous, and/or translucent polymeric binders. In this manner, the semiconductor ink 30 may contain various concentrations of LEDs 28 such that the density of the LEDs 28 may be adjusted for various lighting applications. In some embodiments, the LEDs 28 and semiconductor ink 30 may be sourced from Nth Degree Technologies Worldwide Inc. The semiconductor ink 30 can be applied through various printing processes, including ink jet and silk screen processes to selected portion(s) of the positive electrode 26. More specifically, it is envisioned that the LEDs 28 are dispersed within the semiconductor ink 30, and shaped and sized such that a substantial quantity of them align with the positive and negative electrodes 26, 32 during deposition of the semiconductor ink 30. The portion of the LEDs 28 that ultimately are electrically connected to the positive and negative electrodes 26, 32 may be selectively activated and deactivated by the controller 34. An optional diffusing layer 46 may be arranged below the negative electrode 32 to diffuse light emitted from the LEDs 28 to more evenly excite a photoluminescent structure 48 arranged below the diffusing layer 46.

Referring still to FIG. 2, the photoluminescent structure 48 may be arranged as a coating, layer, film or other suitable deposition. With respect to the presently illustrated embodiment, the photoluminescent structure 48 may be arranged as a multi-layered structure including an energy conversion layer 50, an optional stability layer 52, and an optional protection layer 54. The energy conversion layer 50 includes at least one photoluminescent material 56 having energy converting elements with phosphorescent or fluorescent properties. For example, the photoluminescent material 56 may include organic or inorganic fluorescent dyes including rylenes, xanthenes, porphyrins, phthalocyanines. Additionally or alternatively, the photoluminescent material 56 may include phosphors from the group of Ce-doped garnets such as YAG:Ce. The energy conversion layer 50 may be prepared by dispersing the photoluminescent material 56 in a polymer matrix to form a homogenous mixture using a variety of methods. Such methods may include preparing the energy conversion layer 50 from a formulation in a liquid carrier medium and coating the energy conversion layer 50 to the diffusing layer 46 or the negative electrode 32. The energy conversion layer 50 may be applied to the diffusing layer 46 or the negative electrode 32 by painting, screen printing, flexography, spraying, slot coating, dip coating, roller coating, and bar coating. Alternatively, the energy conversion layer 50 may be prepared by methods that do not use a liquid carrier medium. For example, the energy conversion layer 50 may be rendered by dispersing the photoluminescent material 56 into a solid state solution (homogenous mixture in a dry state) that may be incorporated in a polymer matrix formed by extrusion, injection, compression, calendaring, thermoforming, etc.

To protect the photoluminescent material 56 contained within the energy conversion layer 50 from photolytic and thermal degradation, the photoluminescent structure 48 may optionally include stability layer 52. The stability layer 52 may be configured as a separate layer optically coupled and adhered to the energy conversion layer 50 or otherwise integrated therewith. The photoluminescent structure 48 may also optionally include protection layer 54 optically coupled and adhered to the stability layer 52 or other layer to protect the photoluminescent structure 48 along with other components of the light-producing assembly 12a from physical and chemical damage arising from environmental exposure. The stability layer 52 and/or the protection layer 54 may be combined with the energy conversion layer 50 through sequential coating or printing of each layer, sequential lamination or embossing, or any other suitable means.

The photoluminescent structure 48 and other components of the light-producing assembly 12a may be covered by an over-mold 58 that is in abutting contact with the base 18 and sidewalls 20, 22 of the trough 16. The over-mold 58 may include an elastomeric material (e.g., silicone rubber) and at least a portion 60 of the over-mold 58 that is exposed to the vehicle cabin should be light permeable.

Additional information regarding photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2015, the entire disclosure of which is incorporated herein by reference. Also, additional information regarding printed LED arrangements is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

In operation, the photoluminescent structure 48 is configured to luminesce in response to excitation by light emitted by the LEDs 28. More specifically, light emitted from the LEDs 28 is converted by the photoluminescent material 56 and re-emitted therefrom at a different wavelength. The re-emitted light is outputted into the vehicle cabin via portion 60 of the over-mold 58. Light emitted by the LEDs 28 is referred to herein as inputted light and is demonstrated in FIG. 2 by solid arrows, whereas light re-emitted from the photoluminescent material 56 is referred to herein as converted light and is demonstrated in FIG. 2 by broken arrows. According to one embodiment, the photoluminescent material 56 may be formulated to convert inputted light into a longer wavelength light, otherwise known as down conversion. Alternatively, the photoluminescent material 56 may be formulated to convert inputted light into a shorter wavelength light, otherwise known as up conversion. Under either approach, light converted by the photoluminescent material 56 may be subsequently outputted from the photoluminescent structure 48 or otherwise used in an energy cascade, wherein the converted light serves as inputted light to excite another formulation of photoluminescent material located within the energy conversion layer 50, whereby the subsequent converted light may then be outputted from the photoluminescent structure 48 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, the photoluminescent material 56 is formulated to have a Stokes shift resulting in the converted light having an emission spectrum expressed in a desired color, which may vary depending on the lighting application. For example, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 28, which may offer a relative cost advantage over other colors of LEDs or simply using LEDs of the desired color and foregoing the energy conversion process altogether.

In alternative embodiments, the energy conversion layer 50 may include more than one distinct photoluminescent material, each configured to convert inputted light into a longer or shorter wavelength light. In one embodiment, the distinct photoluminescent materials may be interspersed within the energy conversion layer 50. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 28, which may be variously arranged. In some embodiments, each distinct photoluminescent material may be formulated to have a Stokes shift resulting in the associated converted light having an emission spectrum expressed in a unique color such that the resultant luminescence observed through portion 60 of the over-mold 58 corresponds to a light mixture of the converted light from each distinct photoluminescent material. By mixing the converted light outputted from two or more distinct photoluminescent materials, a greater diversity of colors may be expressed that would otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which are incorporated herein by reference.

In operation, the controller 34 may control the intensity of the LEDs 28 to ultimately affect the brightness in which the photoluminescent structure 48 luminesces. For example, increasing the intensity of the LEDs 28 generally results in the photoluminescent structure 48 exhibiting a brighter luminescence. The controller 34 may control the intensity of the LEDs 28 through pulse-width modulation or direct current control. Additionally or alternatively, the controller 34 may control the light emission duration of the LEDs 28 to affect the duration in which the photoluminescent structure 48 luminesces. For example, the controller 34 may activate the LEDs 28 for an extended duration such that the photoluminescent structure 48 exhibits sustained luminescence. Alternatively, the controller 34 may flash the LEDs 28 at varying time intervals such that the photoluminescent structure 48 exhibits a blinking effect.

Figure 3:
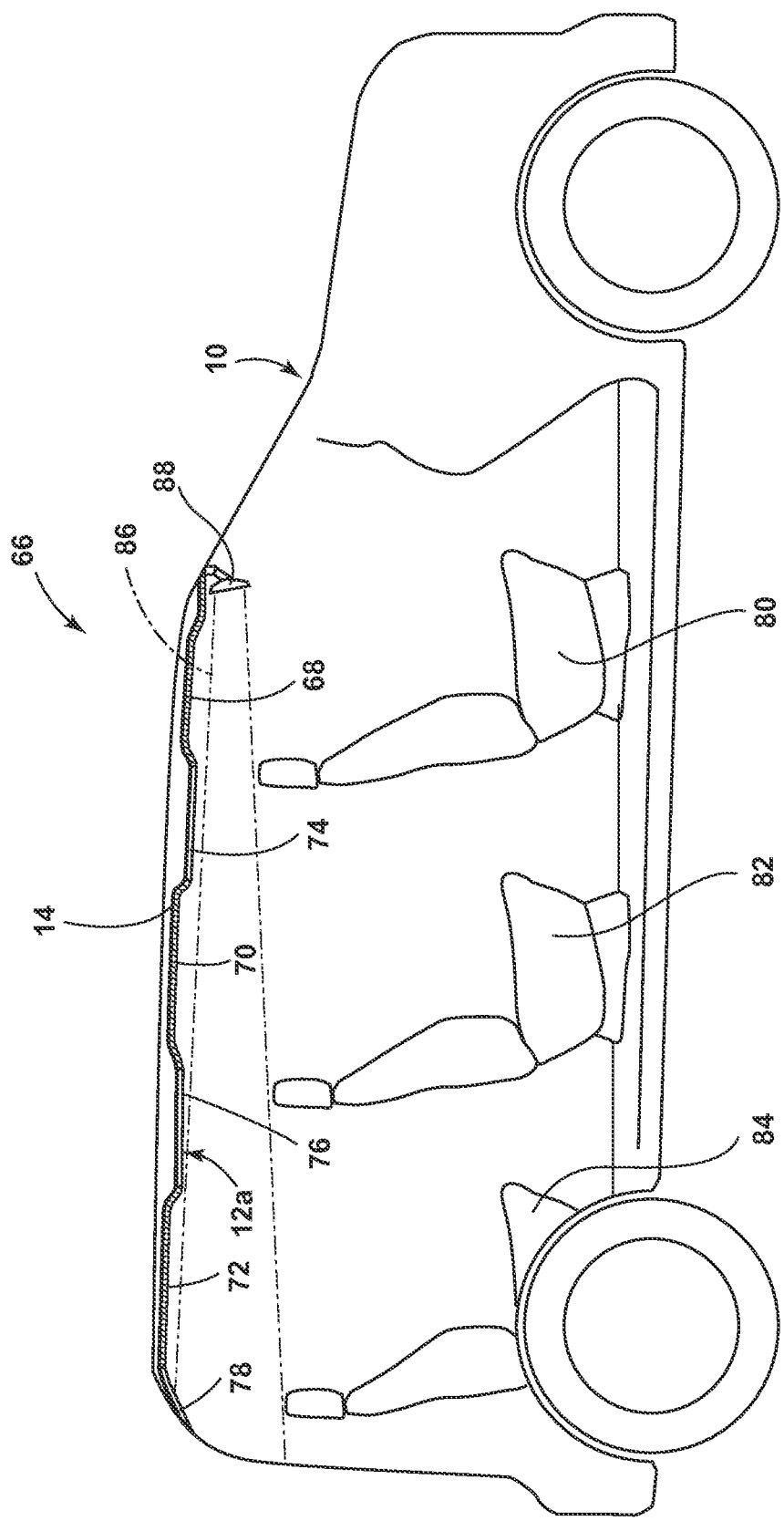
FIG. 3 is a schematic view of a vehicle lighting system utilizing a dome light assembly, according to one embodiment.

Referring to FIG. 3, a schematic diagram of a vehicle lighting system 66 for use in a vehicle 10 is shown according to one embodiment and will be described with continued reference to light-producing assembly 12a depicted in FIG. 2. As shown, light-producing assembly 12a is coupled to a headliner 14 and extends longitudinally with respect to the vehicle 10. According to one embodiment, the LEDs 28 of the light-producing assembly 12a are dispersed in a variable density such that portions of the photoluminescent structure 48 located above occupant seating areas exhibit a greater degree of luminescence than portions of the photoluminescent structure 48 located above non-occupant seating areas. With respect to the illustrated embodiment, a greater density of LEDs 28 may be present at portions 68, 70, and 72 in relation to the LED density present at portions 74, 76, and 78, wherein portions 68, 70, and 72 are located above occupant seating areas 80, 82, and 84, respectively. Furthermore, each of portions 68-78 may be separately connected to one or more controllers to allow their associated LEDs 28 to be activated alone or in combination. In this manner, light-producing assembly 12a may be operated to luminesce in its entirety or in a variety of sections.

As is also shown in FIG. 5, portions 68, 70, and 72 are generally more obscured from a field of view 86 from rear mirror assembly 88 whereas some or all of portions 74, 76, and 78 may become visible in the field of view 86 (e.g., by repositioning the rear mirror assembly 88). According to one embodiment, the light-producing assembly 12a is operable such that only the obscured portions are able to luminesce when the vehicle 10 is in drive to prevent the driver from being blinded in dark conditions. For example, the controller 34 may activate only the LEDs 28 responsible for exciting the corresponding portions of the photoluminescent structure 48 located at portions 68, 70, and 72. The activation of the LEDs 28 may be based on a signal received from vehicle equipment, a user-operated switch, or a vehicle-related condition.

According to one embodiment, portions 68, 70, and 72 of light-producing assembly 12a may be activated alone or in combination depending on the needs of the vehicle occupants. For instance, a vehicle occupant sitting in occupant seating area 84 may control the illumination of portion 72 via a user-operated switch located in the vehicle cabin. Likewise, vehicle occupants sitting in occupant seating areas 80 and 82 may control the illumination of portions 68 and 70, respectively. It is further contemplated that a master switch may be operated to allow or prevent vehicle occupants from controlling the illumination of portions 68, 70, and 72 while the vehicle 10 is in drive.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A dome light assembly for a vehicle, comprising:
a headliner having a trough; and
a light-producing assembly received in the trough and comprising:
a plurality of light sources; and
a photoluminescent structure configured to luminesce in response to excitation by the plurality of light sources, wherein portions of the photoluminescent structure located above occupant seating areas exhibit a greater degree of luminescence than portions of the photoluminescent structure located above non-occupant seating areas.

2. The dome light assembly of claim 1, further comprising a controller for selectively activating the plurality of light sources.

3. The dome light assembly of claim 1, wherein the trough extends in one of a longitudinal direction and a lateral direction relative to the vehicle.

4. The dome light assembly of claim 1, wherein the plurality of light sources comprises LEDs dispersed in a printed LED arrangement.

5. The dome light assembly of claim 4, wherein the LEDs are dispersed in a variable density.

6. The dome light assembly of claim 1, wherein the light-producing assembly comprises visible and obscured portions when the light-producing assembly is viewed from a rearview mirror assembly.

7. The dome light assembly of claim 6, wherein the light-producing assembly is operable such that only the obscured portions luminesce when the vehicle is in drive.

8. A dome light assembly for a vehicle, comprising:
a headliner having a trough extending in a longitudinal direction with respect to the vehicle; and
a light-producing assembly arranged as a strip configured to be received in the trough and comprising:
a plurality of light sources; and
a photoluminescent structure configured to luminesce in response to excitation by the plurality of light sources, wherein the photoluminescent structure comprises visible and obscured portions when the light-producing assembly is viewed from a rearview mirror assembly, and wherein the light-producing assembly is operable such that only the obscured portions luminesce when the vehicle is in drive.

9. The dome light assembly of claim 8, further comprising a controller for selectively activating the plurality of light sources.

10. The dome light assembly of claim 8, wherein the plurality of light sources comprises LEDs dispersed in a printed LED arrangement.

11. The dome light assembly of claim 10, wherein the LEDs are dispersed in a variable density such that portions of the photoluminescent structure located above occupant seating areas exhibit a greater degree of luminescence than portions of the photoluminescent structure located above non-occupant seating areas.

12. A dome light assembly for a vehicle, comprising:
a headliner of the vehicle having a trough; and
a light-producing assembly received in the trough and comprising:
a plurality of light sources dispersed at variable densities; and
a photoluminescent structure configured to luminesce in response to excitation by the plurality of light sources, wherein portions of the photoluminescent structure exhibit variable degrees of luminescence based on the dispersal of the plurality of light sources.

13. The dome light assembly of claim 12, further comprising a controller for selectively activating the plurality of light sources.

14. The dome light assembly of claim 12, wherein the trough extends in one of a longitudinal direction and a lateral direction relative to the vehicle.

15. The dome light assembly of claim 12, wherein the plurality of light sources comprises LEDs dispersed in a printed LED arrangement.

16. The dome light assembly of claim 12, wherein the plurality of light sources are dispersed such that portions of the photoluminescent structure located above occupant seating areas exhibit a greater degree of luminescence than portions of the photoluminescent structure located above non-occupant seating areas.

17. The dome light assembly of claim 12, wherein the light-producing assembly comprises visible and obscured portions when the light-producing assembly is viewed from a rearview mirror assembly.

18. The dome light assembly of claim 17, wherein the light-producing assembly is operable such that only the obscured portions luminesce when the vehicle is in drive.

\* \* \* \* \*